US010719379B2

(12) United States Patent
Silversides

(10) Patent No.: US 10,719,379 B2
(45) Date of Patent: Jul. 21, 2020

(54) FAULT ISOLATION IN TRANSACTION LOGS

(71) Applicant: HEWLETT PACKARD ENTERPRISE DEVELOPMENT LP, Houston, TX (US)

(72) Inventor: Tim Silversides, Dromore (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 45 days.

(21) Appl. No.: 15/770,840

(22) PCT Filed: Feb. 26, 2016

(86) PCT No.: PCT/US2016/019740
§ 371 (c)(1),
(2) Date: Apr. 25, 2018

(87) PCT Pub. No.: WO2017/146721
PCT Pub. Date: Aug. 31, 2017

(65) Prior Publication Data
US 2018/0322003 A1 Nov. 8, 2018

(51) Int. Cl.
G06F 11/00 (2006.01)
G06F 11/07 (2006.01)
G06F 11/20 (2006.01)
G06F 11/10 (2006.01)

(52) U.S. Cl.
CPC ...... *G06F 11/0745* (2013.01); *G06F 11/0793* (2013.01); *G06F 11/1004* (2013.01); *G06F 11/20* (2013.01)

(58) Field of Classification Search
CPC ............. G06F 11/0745; G06F 11/0793; G06F 11/1004; G06F 16/2365; G06F 13/00
See application file for complete search history.

(56) References Cited

U.S. PATENT DOCUMENTS 5,499,367 A * 3/1996 Bamford ............. G06F 11/1471
7,152,242 B2 12/2006 Douglas
7,631,009 B1 * 12/2009 Patel ................... G06F 11/1004
7,707,184 B1 4/2010 Zhang et al.
(Continued)

OTHER PUBLICATIONS

International Search Report & Written Opinion received in PCT Application No. PCT/US2016/019740, dated Nov. 28, 2016, 13 pages.
(Continued)

Primary Examiner — Michael Maskulinski
(74) Attorney, Agent, or Firm — Hewlett Packard Enterprise Patent Department

(57) ABSTRACT

Examples include fault isolation in transaction logs. Some examples involve generation of a transaction log entry associated with a fault domain. The transaction log entry may comprise a transaction signature and a fault domain identifier. Based on the transaction signature, a domain sum may be computed. A determination may be made whether each transaction log entry associated with the fault domain is valid, and a valid domain sum may be computed for the fault domain based on the transaction signature of each valid transaction log entry associated with the fault domain. Based on a determination that the domain sum equals the valid domain sum, the fault domain may be recovered.

20 Claims, 5 Drawing Sheets

(56) References Cited

U.S. PATENT DOCUMENTS

| | | | |
|---|---|---|---|
| 7,891,008 B2 | 2/2011 | Fortune et al. | |
| 8,166,360 B2 | 4/2012 | Koenemann et al. | |
| 8,453,026 B2 | 5/2013 | Chan et al. | |
| 10,140,174 B2 | 11/2018 | Nazari et al. | |
| 2005/0276214 A1 | 12/2005 | Phelan et al. | |
| 2008/0104407 A1 | 5/2008 | Horne et al. | |
| 2008/0189498 A1* | 8/2008 | Brown | G06F 11/1004 711/162 |
| 2010/0088517 A1 | 4/2010 | Piersol | |
| 2014/0115413 A1 | 4/2014 | Guo et al. | |
| 2014/0297608 A1* | 10/2014 | Larson | G06F 11/1471 707/695 |
| 2014/0310555 A1 | 10/2014 | Schulz et al. | |
| 2015/0254264 A1* | 9/2015 | Yu | G06F 11/1469 707/674 |
| 2015/0346066 A1 | 12/2015 | Dutta et al. | |
| 2016/0203043 A1* | 7/2016 | Nazari | G06F 11/1471 714/807 |

OTHER PUBLICATIONS

Microsoft, "Log Signature Discrepancy," 2015, 1 page, https://technet.microsoft.com/en-us/library/aa998316(v=exchg.80).aspx.

* cited by examiner

FAULT ISOLATION IN TRANSACTION LOGS

BACKGROUND

Computing systems may be vulnerable to a variety of failures or faults. These faults may be internal to the system such as hardware-related faults (e.g., input and output device failures, hard disk failures, etc.) and software-related faults (e.g., software errors, software bugs, etc.) or may be introduced to the system by an external source (e.g., installation of faulty or infected software). A fault-tolerant computing system may attempt to protect itself against such faults through a variety of methods.

BRIEF DESCRIPTION OF THE DRAWINGS

The following detailed description references the drawings, wherein.

DETAILED DESCRIPTION

Figure 1:
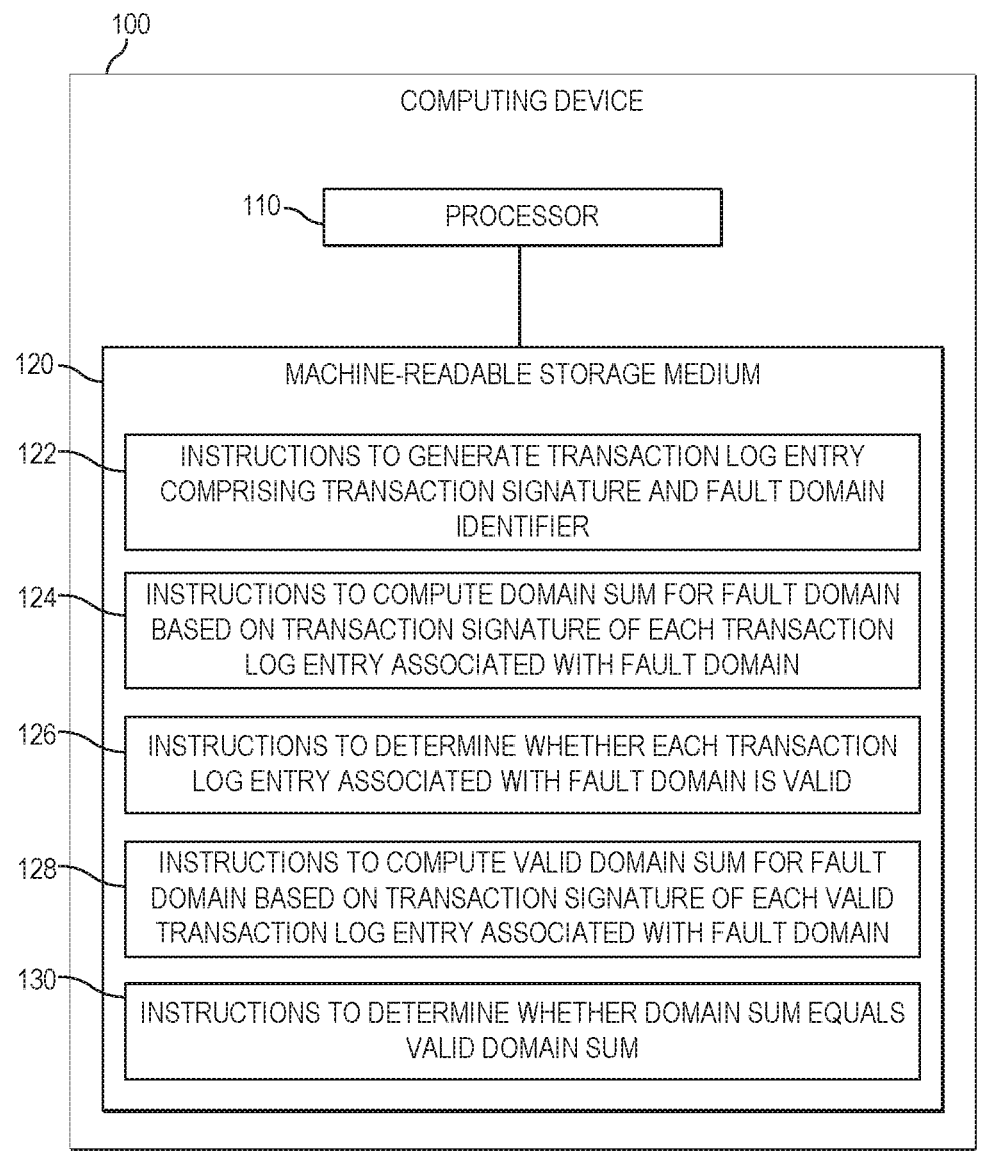
FIG. 1 is a block diagram of an example computing device to provide fault isolation in a transaction log.

Computing systems may use a variety of methods to prevent failures or limit faults within a system. In some examples, computing systems may use a transaction log to record a history of transactions executed. A transaction, as described herein, may refer to a set of actions or operations that may be treated as a unit. The transaction log may be used in the event of a system or component failure to restore a database (or databases) within the computing system to its state just prior to the failure and to ensure that any transactions which were not properly completed prior to the failure are undone.

The transaction log itself may, in some instances, be vulnerable to faults or corrupted entries. In some such examples, a fault or corrupted entry in the transaction log may compromise the integrity of the entire transaction log. Some computing systems may attempt to isolate faults within a transaction log by dividing the transaction log into fault domains. In examples described herein, a fault domain may refer to software components (e.g., applications, instances of applications, etc.) and/or hardware components (e.g., servers, switches, etc.) associated with a point of failure. In examples involving a transaction log (or logs) with more than one fault domain, a fault or corrupted entry in one fault domain may not affect the integrity of another fault domain, allowing for its recovery.

In some examples, a transaction log or logs may be partitioned or pre-allocated, for example at start-up or initialization, into a fixed number of known segments associated with particular fault domains. Each segment may allow for a certain number of transaction log entries within the transaction log. In other examples, a linked list of transaction log entries may be used per fault domain. In yet other examples, a dynamic log region assignment protocol may be used, in which nearly full log regions associated with particular fault domains may be merged with free log sectors depending on an algorithm that may involve, among other things, the rate of accesses to the log regions, the types of accesses, expected future accesses, the space remaining within the log regions, and the remaining free log sectors.

Use of pre-allocated segments of transaction logs associated with particular fault domains, linked lists, and log region assignment protocols may, however, fail to cope with fluctuations in demand for transaction logging, result in resource contention, or be computationally intensive. As such, they may not be suitable for providing adequate fault isolation and enabling recovery of fault domains.

Examples described herein may improve fault isolation in a transaction log. For instance, some examples described herein may utilize a transaction log entry involving a transaction signature and a fault domain identifier. In such examples, the transaction signature may allow for integrity checking and the fault domain identifier may allow for efficient, scalable allocation of a transaction log entry for a fault domain. Flexible identification of fault domains may be allowed, permitting a multitude of fault domains for either high-level or line-grained fault tolerance, as may be desired.

In some examples described herein, a processor of a computing device may provide fault isolation in a transaction log. A transaction log entry may be generated within the transaction log that comprises a transaction signature and a fault domain identifier that identifies a fault domain with which the transaction log entry is associated. A domain sum may be computed for the fault domain based on the transaction signature of each transaction log entry associated with the fault domain. A determination may be made as to whether each transaction log entry associated with the fault domain is valid and based on the determination, a valid domain sum for the fault domain may be computed. The processor may determine whether the domain sum equals the valid domain sum. In examples described herein, a determination, action, etc., that is said to be based on a given condition may be based on that condition alone or based on that condition and other condition(s).

In some examples described herein, a processor of a computing device may generate an intent record for a transaction that comprises a transaction signature and an operation identifier. After generating the intent record for the transaction, the processor may generate a transaction log entry for the transaction that comprises the transaction signature and a fault domain identifier that identifies a fault domain with which the transaction log entry is associated. A domain sum may be computed for the fault domain based on the transaction signature of each transaction log entry associated with the fault domain. A determination may be made as to whether each transaction log entry associated with the fault domain is valid and based on the determination, a valid domain sum for the fault domain may be computed. Based on the domain sum, the valid domain sum, and the intent record, the processor may determine whether the fault domain is valid.

In some examples described herein, a method for providing fault isolation in a transaction log may involve generating a transaction log entry within the transaction log that comprises a transaction signature and a fault domain identifier that identifies a fault domain with which the transaction log entry is associated. A domain sum may be computed for the fault domain based on the transaction signature of each transaction log entry associated with the fault domain and a determination may be made as to whether each transaction log entry associated with the fault domain is valid. Based on the determination, a valid domain sum for the fault domain may be computed. The processor may determine whether the domain sum equals the valid domain sum and based on a determination that the domain sum equals the valid domain sum, the fault domain may be recovered.

Referring now to the drawings, FIG. 1 is a block diagram of an example computing device 100 to provide fault isolation in a transaction log. In examples described herein, a transaction log may refer to a log of transactions in a computing environment or computing system(s). In some examples, the transaction log may involve one or more transaction log entries or transaction log records and may further include transaction log entries or transaction log records associated with or belonging to one or more fault domains. The transaction log may be defined for a particular set of fault domains or may allow transaction log entries relating to any fault domain. The transaction log may also hold the transaction log entries for transactions related to a single database or for transactions related to more than one database. A transaction, as described herein, may refer to a set of operations that may be treated as a unit. The transaction may be associated with a particular fault domain within a computing system.

Computing device 100 includes a processor 110 and a machine-readable storage medium 120 comprising (e.g., encoded with) instructions 122, 124, 126, 128, and 130 executable by processor 110 to implement functionalities described herein in relation to FIG. 1. In some examples, storage medium 120 may include additional instructions. In other examples, the functionalities described herein in relation to instructions 122, 124, 126, 128, 130, and any additional instructions described herein in relation to storage medium 120, may be implemented at least in part in electronic circuitry (e.g., via components comprising any combination of hardware and programming to implement the functionalities described herein). In some examples, computing device 100 may be a controller node for a storage platform or may be located within a controller node for a storage platform.

As used herein, a computing device may be a desktop computer, laptop (or notebook) computer, workstation, tablet computer, mobile phone, smart device, switch, router, server, blade enclosure, or any other processing device or equipment including a processor.

As used herein, a processor may include, for example, one processor or multiple processors included in a single computing device or distributed across multiple computing devices. In examples described herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 110 may fetch, decode, and execute instructions stored on storage medium 120 to perform the functionalities described above in relation to instructions 122, 124, 126, 128, and 130. In other examples, the functionalities of any of the instructions of storage medium 120 may be implemented in the form of electronic circuitry, in the form of executable instructions encoded on a machine-readable storage medium, or a combination thereof. In the example of FIG. 1, storage medium 120 may be implemented by one machine-readable storage medium, or multiple machine-readable storage media.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In the example of FIG. 1, instructions 122 may generate in the transaction log a transaction log entry for a transaction. The transaction log may be a database or other storage mechanism suitable for storing transaction log entries. In some examples, the transaction log may involve a two-dimensional or multi-dimensional array. The transaction log may be global, i.e., capable of being shared across and accessible by more than one device or system. In other examples, the transaction log may be intended for and accessible to a specific device or system. The transaction log may be located either in the computing device or remote from, but accessible to the computing device (e.g., via a computer network). In some such examples, computing device 100 may be located in a controller node and the transaction log may be located in a remote node.

A transaction log entry, as described herein, may refer to a record of a transaction or an entry within a transaction log. In some examples, a single transaction may involve several transaction log entries, each describing or recording an action or operation of the transaction. In other examples, a transaction may involve a single transaction log entry. Instructions 122 may generate the transaction log entry to comprise a transaction signature. As described herein, the transaction signature may involve one or more bits, a value, a code, or other type of signature that may allow for integrity checking. In some examples, the transaction signature may include, for example, a cyclic redundancy check (CRC) code, a checksum, a hash value or cryptographic hash value, a parity bit, or other error-detecting mechanism. In some examples, each transaction log entry may have a unique transaction signature. In other examples, transaction signatures may not be unique between transaction log entries.

As depicted in FIG. 1, instructions 122 may further generate the transaction log entry to comprise a fault domain identifier that identifies a fault domain with which the transaction log entry is associated. As discussed above, the fault domain may refer to software components (e.g., applications, instances of applications, etc.) and/or hardware components (e.g., servers, switches, etc.) associated with a point of failure. The transaction log entry may involve a transaction associated with a particular fault domain identified by the fault domain identifier. In some examples, generation of the transaction log entry may involve a flexible and dynamic identification of a new fault domain within the transaction log (i.e., fault domains within a transaction log may be dynamically allocated).

In some examples, the transaction log entry may also comprise an operation identifier. As described herein, the operation identifier may identify or describe an operation associated with the transaction. For instance, the operation identifier may identify the operation as an add operation or a remove operation. The add operation may refer to the insertion or addition of a row in the database as part of the transaction. The remove operation may refer to the deletion or removal of a row in the database as part of the transaction.

In some examples, the transaction log entry may also comprise a transaction identifier for identifying all transaction log entries associated with a particular transaction. The transaction log entry may also, in some examples, comprise one or more of a log sequence number, a begin time, an end time, a pointer, a counter, or other such field to allow for ordering, sequencing, or managing of the transaction log entries and/or the transactions. The transaction log entry may include fields that further support or may be of use in describing the transaction, recovering the database, and/or managing the transaction log entries and/or the transaction log. In some examples, instructions 122 may generate the transaction log entry in the transaction log by computing or determining the transaction signature, and by determining, identifying, and/or building each of the fields of the transaction log entry. In other examples, instructions 122 may generate the transaction log entry by copying or acquiring information related to the fields of the transaction log entry from another source or location.

In some examples, instructions 122 may involve instructions to build a log entry for the transaction in a local memory area and instructions to copy the log entry for the transaction to the transaction log entry in the transaction log. In some examples, the log entry may comprise each of the fields that comprise the transaction log entry. The local memory area, as described herein, may be implemented by at least one machine-readable storage medium and is local to computing device 100. In some examples, the local memory area may be located on computing device 100. In other examples, the local memory area may be located with computing device 100. For example, both computing device 100 and local memory 100 may be located at a controller node.

In such examples, Instructions 122 may further involve instructions to copy the log entry for the transaction in the local memory area to the transaction log entry for the transaction in a remote memory area to generate the transaction log entry. Copying the log entry in the local memory area to the transaction log entry in the remote memory area may involve a remote direct memory access (RDMA) operation in which all or some of the data is copied directly from the local memory area to the remote memory area. In other examples, copying the log entry in the local memory area to the transaction log entry in the remote memory area may involve data transfer via buffering. The remote memory area, as described here, may be implemented by at least one machine-readable storage medium and is remote to computing device 100. For instance, where computing device 100 is located at a controller node, the remote memory area may be located at a remote node.

Instructions 124 may identify each transaction log entry associated with the fault domain and compute a domain sum. Instructions 124 may scan the transaction log, perform a search, or otherwise identify transaction log entries associated with the fault domain. For instance, instructions 124 may iterate through the transaction log to identify the transaction log entries associated with the fault domain and to compute the domain sum. Based (at least in part) on the transaction signature of each transaction log entry identified to be associated with the fault domain, instructions 124 may compute a domain sum. As used in examples herein, the domain sum may refer to a sum or value based (at least in part) on the transaction signature of each transaction log entry associated with the fault domain.

In some examples, instructions 124 may compute the domain sum by adding the transaction signatures of each transaction log entry associated with the fault domain. In such examples, the transaction signature may involve a checksum and instructions 124 may compute the domain sum by adding the checksum of each transaction log entry associated with the fault domain via an atomic add operation. In some such examples, the atomic add operation may involve a remote direct memory access (RDMA) operation. In other examples, the transaction signature may involve a hash value or cryptographic hash value and instructions 124 may compute the domain sum by performing an atomic add of the hash value or cryptographic hash value of each transaction log entry associated with the fault domain.

In yet other examples, the transaction log entry may involve an operation identifier and instructions 124 may determine whether the operation identifier of each transaction log entry associated with the fault domain identifies an add operation or a remove operation. In some examples, the transaction signatures of each transaction log entry associated with the fault domain are added or subtracted based on the operation identified by the operation identifier. In one such example, the transaction signatures of transaction log entries associated with add operations may be added together and the transaction signatures of transaction log entries associated with remove operations may be subtracted to compute the domain sum.

In some examples, after computing the domain sum, computing device 100 may store the domain sum with the transaction log either in the computing device or remote from, but accessible to the computing device (e.g., via a computer network). In other examples, computing device 100 may store the domain sum separate from the transaction log either in the computing device or remote from, but accessible to the computing device.

Instructions 126 may identify each transaction log entry associated with the fault domain and determine whether each transaction log entry associated with the fault domain is valid. In some examples, instructions 126 may scan the transaction log, perform a search, or otherwise identify transaction log entries associated with the fault domain. For example, instructions 126 may iterate through the transaction log to identify the transaction log entries associated with the fault domain and to determine whether each is valid. Instructions 126 may also iterate through the transaction log entries associated with the fault domain to determine whether each is valid.

Instructions 126 may perform integrity checking to determine whether each transaction log entry associated with the fault domain is valid. In some examples, instructions 126 may utilize the transaction signature for performing integrity checking. In one such example, the transaction signature may involve a checksum and instructions 126 may compare the current checksum of each transaction log entry against a stored checksum for each transaction log entry. Where the checksum values match, instructions 126 may determine those transaction log entries to be valid. Where the checksum values do not match, instructions 126 may determine those transaction log entries to be invalid. In other such examples, the transaction signature may involve a hash value and instructions 126 may compare the current hash value of each transaction log entry against a stored hash value for each transaction log entry. Where the hash values match, instructions 126 may determine those transaction log entries to be valid. Where the hash values do not match, instructions 126 may determine those transaction log entries to be invalid. In other examples, instructions 126 may use portions of the transaction log entry other than the transaction signature to perform integrity checking. For example, instructions 126 may utilize a parity bit for integrity checking. In other such examples, instructions 126 may use a checksum or hash value (separate from any used for a transaction signature) or any other mechanism suitable for performing integrity checking.

Once a determination has been made as to whether each transaction log entry associated with the fault domain is valid, instructions 128 may identify each valid transaction log entry associated with the fault domain and compute a valid domain sum. Instructions 128 may scan the transaction log, perform a search, or otherwise identify the transaction log entries associated with the fault domain that have been determined to be valid. For instance, instructions 128 may iterate through the transaction log to identify the valid transaction log entries associated with the fault domain and to compute the valid domain sum. Based (at least in part) on the transaction signature of each valid transaction log entry associated with the fault domain, instructions 128 may compute a valid domain sum. As described herein, the valid domain sum may refer to a sum or value based (at least in part) on the transaction signature of each valid transaction log entry associated with the fault domain.

In some examples, instructions 128 may compute the valid domain sum by adding the transaction signatures of each valid transaction log entry associated with the fault domain. In such examples, the transaction signature may involve a checksum and instructions 128 may compute the valid domain sum by adding the checksum of each valid transaction log entry associated with the fault domain via an atomic add operation. In some such examples, the atomic add operation may involve an RDMA operation. In other examples, the transaction signature may involve a hash value or cryptographic hash value and instructions 128 may compute the valid domain sum by performing an atomic add of the hash value or cryptographic hash value of each valid transaction log entry associated with the fault domain.

In yet other examples, the transaction log entry may involve an operation identifier and instructions 128 may determine whether the operation identifier of each valid transaction log entry associated with the fault domain identifies an add operation or a remove operation. In some examples, the transaction signatures of each valid transaction log entry associated with the fault domain are added or subtracted based on the operation identified by the operation identifier. In one such example, the transaction signatures of valid transaction log entries associated with add operations may be added together and the transaction signatures of valid transaction log entries associated with remove operations may be subtracted to compute the valid domain sum.

In some examples, after computing the valid domain sum, computing device 100 may store the valid domain sum with the transaction log either in the computing device or remote from, but accessible to the computing device (e.g., via a computer network). In other examples, computing device 100 may store the valid domain sum separate from the transaction log either in the computing device or remote from, but accessible to the computing device.

Instructions 130 may acquire the domain sum for the fault domain and the valid domain sum for the fault domain and may determine whether the domain sum equals the valid domain sum. Instructions 130 may request and receive or otherwise obtain the domain sum and the valid domain sum for the fault domain. Instructions 130 may compare the domain sum for the fault domain to the valid domain sum for the fault domain to determine if they are equal.

In some examples, instructions 122 and 124 may iterate several times before any of instructions 126, 128, and 130 are performed. In such examples, instructions 126, 128, and 130 may be performed after a fault or failure has been identified. In other examples, instructions 126, 128, and 130 may be performed on a periodic or regular basis, for example, after a certain number of transaction log entries have been generated.

In some examples, instructions 122, 124, 126, 128, and 130, may be part of an installation package that, when installed, may be executed by processor 110 to implement the functionalities described above. In such examples, storage medium 120 may be a portable medium, such as a CD, DVD, or flash drive, or a memory maintained by a server from which the installation package can be downloaded and installed. In other examples, instructions 122, 124, 126, 128, and 130 may be part of an application, applications, or component(s) already installed on computing device 100 including processor 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

Figure 2:
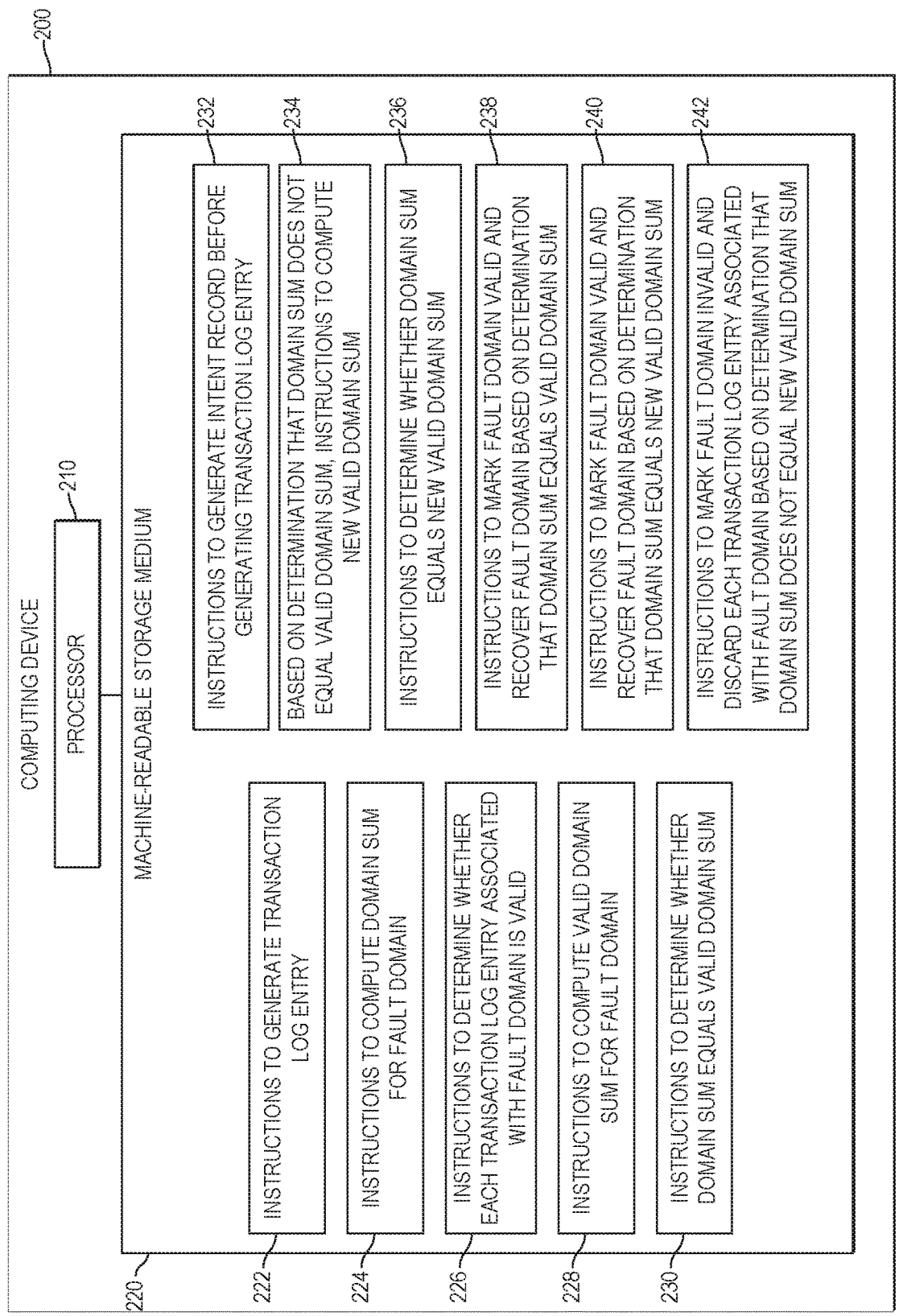
FIG. 2 is a block diagram of an example computing device to provide fault isolation in a transaction log, recover a valid fault domain, and discard each transaction log entry associated with an invalid fault domain.

Further examples are described herein in relation to FIG. 2, which is a block diagram of an example computing device 200 to provide fault isolation in a transaction log, recover a valid fault domain, and discard each transaction log entry associated with an invalid fault domain. As discussed above, a transaction log may refer to a log of transactions in a computing environment or computing system(s). In some examples, the transaction log may involve one or more transaction log entries or transaction log records. A transaction, as described herein, may refer to a set of actions or operations that may be treated as a unit. Computing device 200 includes a processor 210 and a machine-readable storage medium 220 comprising (e.g., encoded with) instructions 222, 224, 226, 228, 230, 232, 234, 236, 238, 240, and 242 executable by processor 210 to implement functionalities described herein in relation to FIG. 2. In some examples, storage medium 220 may include additional instructions. In other examples, the functionalities described herein in relation to instructions 222, 224, 226, 228, 230, 232, 234, 236, 238, 240, 242, and any additional instructions described herein in relation to storage medium 220, may be implemented at least in part in electronic circuitry (e.g., via components comprising any combination of hardware and programming to implement the functionalities described herein). In some examples, computing device 200 may be a controller node for a storage platform or may be located within a controller node for a storage platform.

As used herein, a computing device may be a desktop computer, laptop (or notebook) computer, workstation, tablet computer, mobile phone, smart device, switch, router, server, blade enclosure, or any other processing device or equipment including a processor.

As used herein, a processor may include, for example, one processor or multiple processors included in a single computing device or distributed across multiple computing devices. In examples described herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 210 may fetch, decode, and execute instructions stored on storage medium 220 to perform the functionalities described above in relation to instructions 222, 224, 226, 228, 230, 232, 234, 236, 238, 240, and 242. In other examples, the functionalities of any of the instructions of storage medium 220 may be implemented in the form of electronic circuitry, in the form of executable instructions encoded on a machine-readable storage medium, or a combination thereof. In the example of FIG. 2, storage medium 220 may be implemented by one machine-readable storage medium, or multiple machine-readable storage media.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

Instructions 222 may generate in the transaction log a transaction log entry for a transaction, the transaction log entry comprising a transaction signature and a fault domain identifier that identifies a fault domain with which the transaction log entry is associated, as described above in relation to instructions 122 in FIG. 1. The transaction log may be located either in the computing device or remote from, but accessible to the computing device (e.g., via a computer network). In some such examples, computing device 200 may be located in a controller node and the transaction log may be located in a remote node.

Instructions 224 may compute a domain sum for the fault domain based (at least in part) on the transaction signature of each transaction log entry associated with the fault domain, as described above in relation to instructions 124 in FIG. 1. Instructions 226 may determine whether each transaction log entry associated with the fault domain is valid, as described above in relation to instructions 126 of FIG. 1. Instructions 228 may compute a valid domain sum for the fault domain based (at least in part) on the transaction signature of each valid transaction log entry associated with the fault domain, as described above in relation to instructions 128 of FIG. 1. Instructions 230 may determine whether the domain sum equals the valid domain sum, as described above in relation to instructions 130 of FIG. 1.

Based (at least in part) on a determination that the domain equals the valid domain sum, instructions 238 may mark the fault domain valid and recover the fault domain. In some examples, instructions 238 may mark the fault domain valid via a field in the transaction log entry. In other examples, instructions 238 may mark the fault domain valid by generating and maintaining a list of valid fault domains and/or a list of invalid fault domains either together with the transaction log or separate from the transaction log. Such a list may be located in the computing device or remote from, but accessible to the computing device (e.g., via a computer network). Instructions 238 may, in some examples, recover the fault domain by replaying the transaction log entries associated with the fault domain and/or reverting transaction log entries, as necessary. In some such examples, recovery of the fault domain may involve replaying a committed transaction or transactions (i.e., transactions applied to the database) at the time of the failure or fault to ensure the effects of the transaction(s) persist in the database at issue. Recovery of the fault domain may also involve reverting or undoing an uncommitted transaction or transaction(s) to ensure the effects of the uncommitted transaction(s) do not persist in the database at issue.

As illustrated in FIG. 2, instructions 232 may generate an intent record for the transaction before generating the transaction log entry in the transaction log. The intent record, as described herein, may refer to a record of an ensuing transaction log entry. In some examples, the intent record may allow for more complete integrity checking and may describe the transaction and/or the ensuing transaction log entry. Instructions 232 may generate the intent record to comprise the transaction signature that will be recorded in the transaction log as part of the transaction log entry. As discussed above, the transaction signature may involve one or more bits, a value, a code, or other type of signature that may allow for integrity checking. Instructions 232 may further generate the intent record to comprise an operation identifier. As also discussed above, the operation identifier may identify or describe an operation associated with the transaction. For instance, the operation identifier may identify the operation as an add operation or a remove operation. The add operation may refer to the insertion or addition of a row in the database as part of the transaction. The remove operation may refer to the deletion or removal of a row in the database as part of the transaction. In some examples, the intent record may also indicate a transaction log entry location to identify the location of the transaction log entry within the transaction log. The intent record may further include fields that support integrity checking and/or that may be of use in identifying or describing the transaction and/or transaction log entry.

In some examples, the intent record may be associated with a particular fault domain. In some such examples, an intent record's location may identify the fault domain with which it is associated. In other such examples, the intent record may include a field that identifies the fault domain. In some examples, instructions 232 may generate the intent record by computing or determining the transaction signature, and by determining, identifying, and/or building each of the fields of the intent record. In other examples, instructions 232 may generate the intent record by copying or acquiring information related to the fields of the intent record from another source or location.

The intent record may be a single entry associated with the fault domain that is rewritten prior to the generation of each transaction log entry associated with the fault domain. In other examples, the intent record may be a portion of an intent log that logs a series of intent records. The intent record may be located either in the computing device or remote from, but accessible to the computing device (e.g., via a computer network). In some such examples, computing device 200 may be located in a controller node and the intent record may be located in a remote node. The intent record may be stored with the transaction log or may be stored separately from the transaction log.

In some examples, all of the functionalities described herein in relation to instructions 222 may occur after the functionalities described herein in relation to instructions 232 to generate an intent record before generating the transaction log entry in the transaction log. In one such example, the intent record for the transaction may be generated and then the transaction log entry in the transaction log may be generated by any of the functionalities described above in relation to instructions 222 or by copying the intent record. In other examples, some of the functionalities described herein in relation to instructions 222 may occur before the functionalities described herein in relation to instructions 232 to generate an intent record before generating the transaction log entry in the transaction log. In one example, an intent record may be generated prior to generation of the transaction log entry in the transaction log with some of the functionalities described herein in relation to instructions 222 occurring before the generation of the intent record. For instance, instructions 222 may first build a log entry for the transaction in a local memory area. Instructions 232 may then generate an intent record for the transaction. In one example, generation of the intent record may involve copying the log entry for the transaction from the local memory area. Instructions 222 may then copy the log entry for the transaction from the local memory area to the transaction log entry for the transaction in a remote memory area, generating the transaction log entry in the transaction log after generation of the intent record. In one such example, the building of the log entry in the local memory area, the generation of the intent record, and the copying of the log entry from the local memory area to the remote memory area to generate the transaction log entry in the transaction log may be non-interleaved.

Instructions 234 may, based (at least in part) on a determination that the domain sum does not equal the valid domain sum, compute a new valid domain sum for the fault domain. The new valid domain sum may be based (at least in part) on the operation identifier in the intent record. Instructions 234 may identify and acquire or access the intent record associated with the fault domain. In some examples, each fault domain may be associated with a single intent record and the intent record may be identified by determining the fault domain. In other examples, intent records may be logged in an intent log and the intent record may be identified by determining the last or most recent intent record associated with the fault domain. Instructions 234 may also identify and acquire or access the valid domain sum for the fault domain.

In some examples, instructions 234 may involve instructions to determine whether the operation identifier of the intent record identifies an add operation or a remove operation. Instructions 234 may analyze the operation identifier to identify whether the operation comprises an add operation or a remove operation. Based (at least in part) on a determination that the operation identifier of the intent record identifies a remove operation, instructions 234 may involve instructions to add the transaction signature of the intent record to the valid domain sum to compute the new valid domain sum. In some examples, the transaction signature may involve a checksum and adding the transaction signature to the valid domain sum may involve an atomic add operation of the checksum to the valid domain sum. Based (at least in part) on a determination that the operation identifier of the intent record identifies an add operation, instructions 234 may involve instructions to subtract the transaction signature of the intent record from the valid domain sum to compute the new valid domain sum. In some examples, the transaction signature may involve a checksum and subtracting the transaction signature from the valid domain sum may involve an atomic subtract operation of the checksum from the valid domain sum.

In some examples, after computing the new valid domain sum, computing device 200 may store the new valid domain sum with the transaction log either in the computing device or remote from, but accessible to the computing device (e.g., via a computer network). In other examples, computing device 200 may store the new valid domain sum separate from the transaction log either in the computing device or remote from, but accessible to the computing device.

In the example of FIG. 2, instructions 236 may acquire the domain sum for the fault domain and the new valid domain sum for the fault domain and determine whether the domain sum equals the new valid domain sum. In some examples, based (at least in part) on the determination that the domain sum does not equal the valid domain sum, instructions 236 may request and receive or otherwise obtain the domain sum and the new valid domain sum for the fault domain. Instructions 236 may compare the domain sum for the fault domain to the new valid domain sum for the fault domain to determine if they are equal.

Based (at least in part) on a determination that the domain sum equals the new valid domain sum for the fault domain, instructions 240 may mark the fault domain valid and recover the fault domain. In some examples, instructions 240 may mark the fault domain valid via a field in the transaction log entry. In other examples, instructions 240 may mark the fault domain valid by generating and maintaining a list of valid fault domains and/or a list of invalid fault domains either together with the transaction log or separate from the transaction log. Such a list may be located in the computing device or remote from, but accessible to the computing device (e.g., via a computer network). Instructions 240 may, in some examples, recover the fault domain by replaying the transaction log entries associated with the fault domain and/or reverting transaction log entries, as necessary. In some such examples, recovery of the fault domain may involve replaying a committed transaction or transactions (i.e., transactions applied to the database) at the time of the failure or fault to ensure the effects of the transaction(s) persist in the database at issue. Recovery of the fault domain may also involve reverting or undoing an uncommitted transaction or transaction(s) to ensure the effects of the uncommitted transaction(s) do not persist in the database at issue.

Based (at least in part) on a determination that the domain sum equals the new valid domain sum for the fault domain, instructions 242 may mark the fault domain invalid. In some examples, instructions 242 may mark the fault domain invalid by generating and maintaining a list of invalid fault domains and/or a list of valid fault domains either together with the transaction log or separate from the transaction log. Such a list may be located in the computing device or remote from, but accessible to the computing device (e.g., via a computer network). Instructions 242 may, in some examples, discard each transaction log entry associated with the fault domain. Instructions 242 may scan the transaction log, perform a search, or otherwise identify each transaction log entry associated with the fault domain and discard each transaction log entry by deleting the entries, overwriting the entries with new data, removing the entries from the transaction log, and/or ignoring the entries.

In some examples, instructions 222, 224, and 232 may iterate several times before any of instructions 226, 228, 230, 234, 236, 238, 240, and 242 are performed. In such examples, instructions 226, 228, 230, 234, 236, 238, 240, and 242 may be performed after a fault or failure has been identified. In other examples, some or all of instructions 226, 228, 230, 234, 236, 238, 240, and 242 may be performed on a periodic or regular basis, for example, after a certain number of transaction log entries have been generated.

In some examples, instructions 222, 224, 226, 228, 230, 232, 234, 236, 238, 240, and 242, may be part of an installation package that, when installed, may be executed by processor 210 to implement the functionalities described above. In such examples, storage medium 220 may be a portable medium, such as a CD, DVD, or flash drive, or a memory maintained by a server from which the installation package can be downloaded and installed. In other examples, instructions 222, 224, 226, 228, 230, 232, 234, 236, 238, 240, and 242 may be part of an application, applications, or component(s) already installed on computing device 200 including processor 210. In such examples, the storage medium 220 may include memory such as a hard drive, solid state drive, or the like. In some examples, functionalities described herein in relation to FIG. 2 may be provided in combination with functionalities described herein in relation to any of FIGS. 1, 3, and 4.

Figure 3:
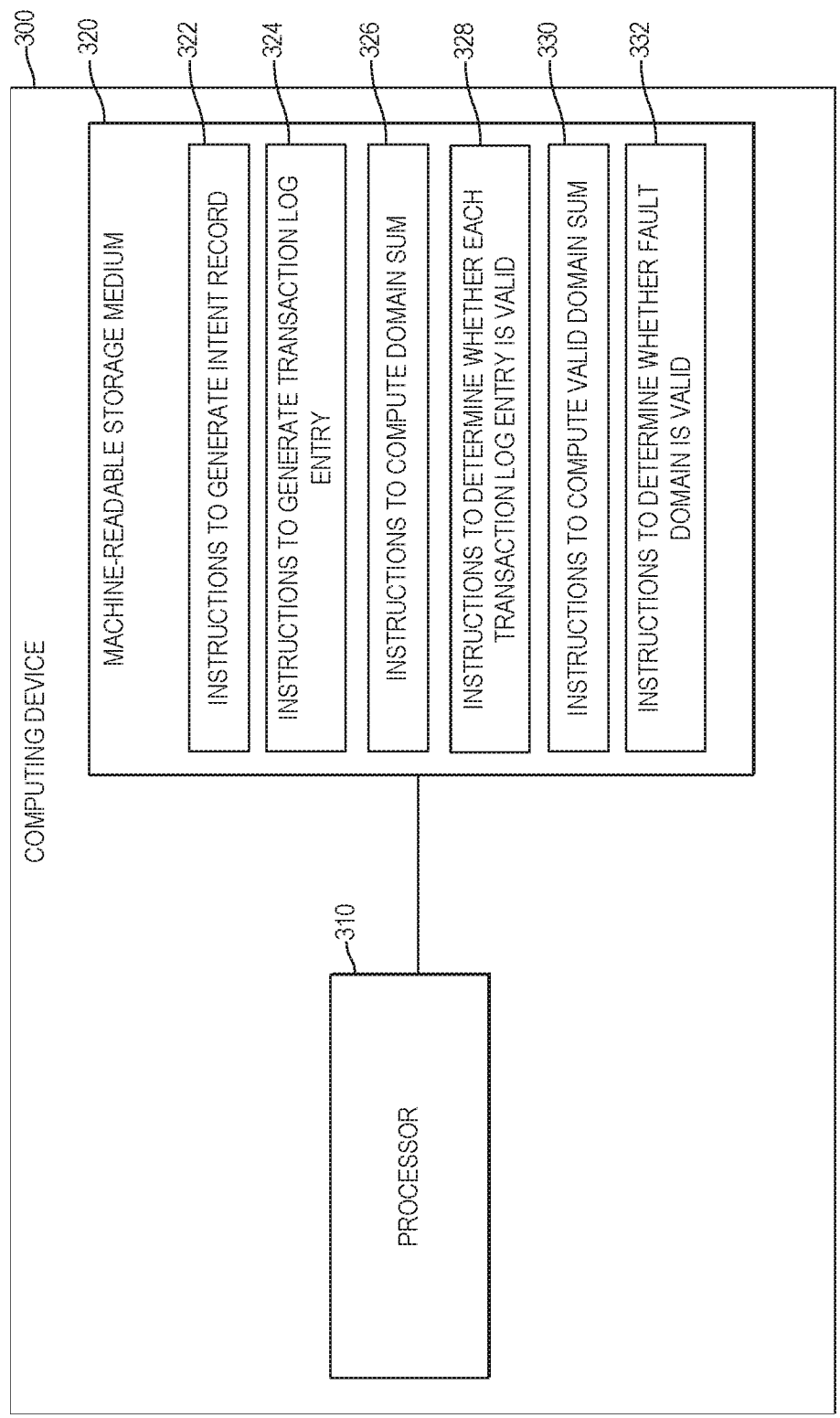
FIG. 3 is a block diagram of an example computing device to determine whether a fault domain is valid.

FIG. 3 is a block diagram of an example computing device 300 to provide fault isolation in a transaction log and determine whether a fault domain is valid. As discussed above, a transaction log may refer to a log of transactions in a computing environment or computing system(s). In some examples, the transaction log may involve one or more transaction log entries or transaction log records. A transaction, as described herein, may refer to a set of actions or operations that may be treated as a unit. Computing device 300 includes a processor 310 and a machine-readable storage medium 320 comprising (e.g., encoded with) instructions 322, 324, 326, 328, 330, and 332 executable by processor 310 to implement functionalities described herein in relation to FIG. 3. In some examples, storage medium 320 may include additional instructions. In other examples, the functionalities described herein in relation to instructions 322, 324, 326, 328, 330, 332, and any additional instructions described herein in relation to storage medium 320, may be implemented at least in park in electronic circuitry (e.g., via components comprising any combination of hardware and programming to implement the functionalities described herein). In some examples, computing device 300 may be a controller node for a storage platform or may be located within a controller node for a storage platform.

As used herein, a computing device may be a desktop computer, laptop (or notebook) computer, workstation, tablet computer, mobile phone, smart device, switch, router, server, blade enclosure, or any other processing device or equipment including a processor.

As used herein, a processor may include, for example, one processor or multiple processors included in a single computing device or distributed across multiple computing devices. In examples described herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 310 may fetch, decode, and execute instructions stored on storage medium 220 to perform the functionalities described above in relation to instructions 322, 324, 326, 328, 330, and 332. In other examples, the functionalities of any of the instructions of storage medium 320 may be implemented in the form of electronic circuitry, in the form of executable instructions encoded on a machine-readable storage medium, or a combination thereof. In the example of FIG. 3, storage medium 320 may be implemented by one machine-readable storage medium, or multiple machine-readable storage media.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

Instructions 322 may generate an intent record for a transaction that is associated with a fault domain and comprises a transaction signature and an operation identifier, as described above in relation to instructions 232 in FIG. 2. As described above, the intent record may be generated before a transaction log entry is generated in the transaction log. Instructions 324 may generate in the transaction log a transaction log entry for the transaction, as described above in relation to instructions 222 in FIG. 2. The transaction log entry may be generated after generating the intent record, as described above in relation to instructions 222 and 232 in FIG. 2.

Instructions 326 may compute a domain sum for the fault domain based (at least in part) on the transaction signature of each transaction log entry associated with the fault domain, as described above in relation to instructions 224 in FIG. 2. Instructions 328 may determine whether each transaction log entry associated with the fault domain is valid, as described above in relation to instructions 226 of FIG. 2. Instructions 330 may compute a valid domain sum for the fault domain based (at least in part) on the transaction signature of each valid transaction log entry associated with the fault domain, as described above in relation to instructions 228 of FIG. 2.

Instructions 332 may determine whether the fault domain is valid based (at least in part) on the domain sum, the valid domain sum, and the intent record. In some examples, instructions 332 may determine whether the domain sum equals the valid domain sum, as described above in relation to instructions 230 of FIG. 2. Based (at least in part) on a determination that the domain sum equals the valid domain sum, instructions 332 may mark the fault domain valid and recover the fault domain, as described above in relation to instructions 238 of FIG. 2. Based (at least in part) on a determination that the domain sum does not equal the valid domain sum, instructions may compute a new valid domain sum for the fault domain, as described above in relation to instructions 234 of FIG. 2. Further, instructions 332 may determine whether the domain sum equals the new valid domain sum, as described above in relation to instructions 236 of FIG. 2. Instructions 332 may mark the fault domain valid and recover the fault domain based (at least in part) on a determination that the domain sum equals the new valid domain sum, as described above in relation to instructions 240 of FIG. 2. Instructions 332 may also mark the fault domain invalid and discard each transaction log entry associated with the fault domain based (at least in part) on a determination that the domain sum does not equal the new valid domain sum, as described above in relation to instructions 242 of FIG. 2.

In some examples, instructions 322, 324, and 326 may iterate several times before any of instructions 328, 330, and 332 are performed. In such examples, instructions 328, 330, and 332 may be performed after a fault or failure has been identified. In other examples, instructions 328, 330, and 332 may be performed on a periodic or regular basis, for example, after a certain number of transaction log entries have been generated.

In some examples, instructions 322, 324, 326, 328, 330, and 332, may be part of an installation package that, when installed, may be executed by processor 310 to implement the functionalities described above. In such examples, storage medium 320 may be a portable medium, such as a CD, DVD, or flash drive, or a memory maintained by a server from which the installation package can be downloaded and installed. In other examples, instructions 322, 324, 326, 328, 330, and 332 may be part of an application, applications, or component(s) already installed on computing device 300 including processor 310. In such examples, the storage medium 320 may include memory such as a hard drive, solid state drive, or the like. In some examples, functionalities described herein in relation to FIG. 3 may be provided in combination with functionalities described herein in relation to any of FIGS. 1, 2, and 4.

Figure 4A:
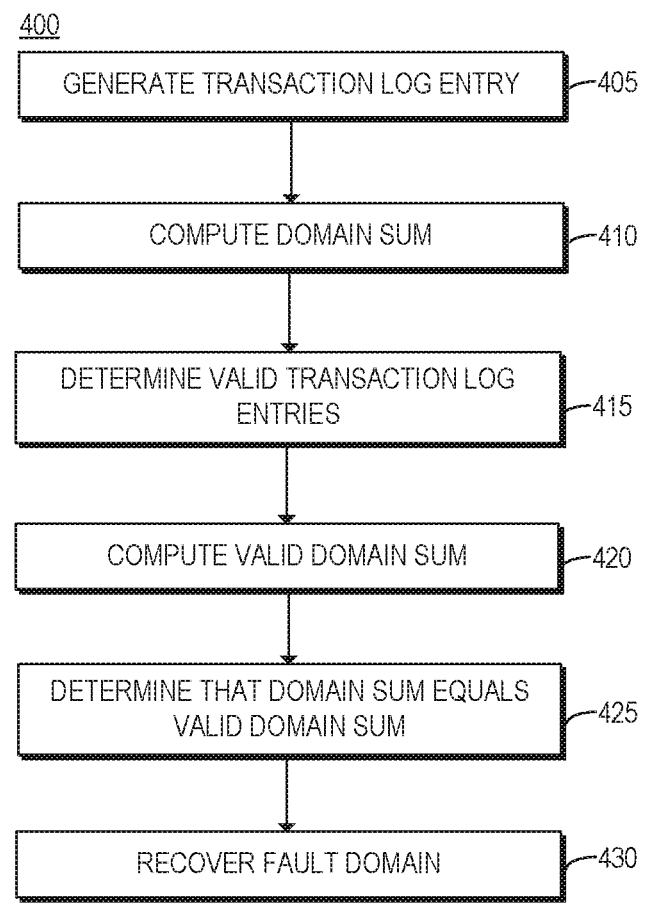
FIG. 4A is a flowchart of an example method including recovering a fault domain based on a determination that a domain sum of the fault domain equals a valid domain sum of the fault domain.

FIG. 4A is a flowchart of an example method 400 including recovering a fault domain based on a determination that a domain sum of the fault domain equals a valid domain sum of the fault domain. Although execution of method 400 is described below with reference to computing device 200 of FIG. 2, other suitable systems or devices for the execution of method 400 can be utilized (e.g., computing device 100 of FIG. 1). Additionally, implementation of method 400 is not limited to such examples.

In the example of FIG. 4A, method 400 may be a method of device 200. At 405 of method 400, instructions 222 may generate in a transaction log a transaction log entry for a transaction, the transaction log entry comprising a transaction signature and a fault domain identifier that identifies a fault domain with which the transaction log entry is associated. This generation may be performed as described above in relation to instructions 222 of FIG. 2. At 410, instructions 224 may compute a domain sum for the fault domain based (at least in part) on the transaction signature of each transaction log entry associated with the fault domain. This computation may be performed as described above in relation to instructions 224 of FIG. 2. At 415, instructions 226 may determine each transaction log entry associated with the fault domain that is valid. This determination may be performed as described above in relation to instructions 226 of FIG. 2. At 420, instructions 228 may compute a valid domain sum for the fault domain based (at least in part) on the transaction signature of each valid transaction log entry associated with the fault domain. This computation may be performed as described above in relation to instructions 228 of FIG. 2. At 425, instructions 230 may determine that the domain sum equals the valid domain sum. This determination may be performed as described above in relation to instructions 230 of FIG. 2. At 430, instructions 238 may recover the fault domain. In some examples, instructions 238 may also mark the fault domain valid. Recovery of the fault domain may be performed as described above in relation to instructions 238 of FIG. 2.

Although the flowchart of FIG. 4A shows a specific order of performance of certain functionalities, method 400 is not limited to that order. For example, some of the functionalities shown in succession in the flowchart may be performed in a different order, may be executed concurrently or with partial concurrence, or a combination thereof. In some examples, 405 and 410 may iterate several times before the method proceeds to 415. In such examples, the method may proceed to 415 after a fault or failure has been identified. In other examples, the method may proceed to 415 on a periodic or regular basis, for example, after a certain number of transaction log entries have been generated. In some examples, functionalities described herein in relation to FIG. 4A may be provided in combination with functionalities described herein in relation to any of FIGS. 1-3 and 4B.

Figure 4B:
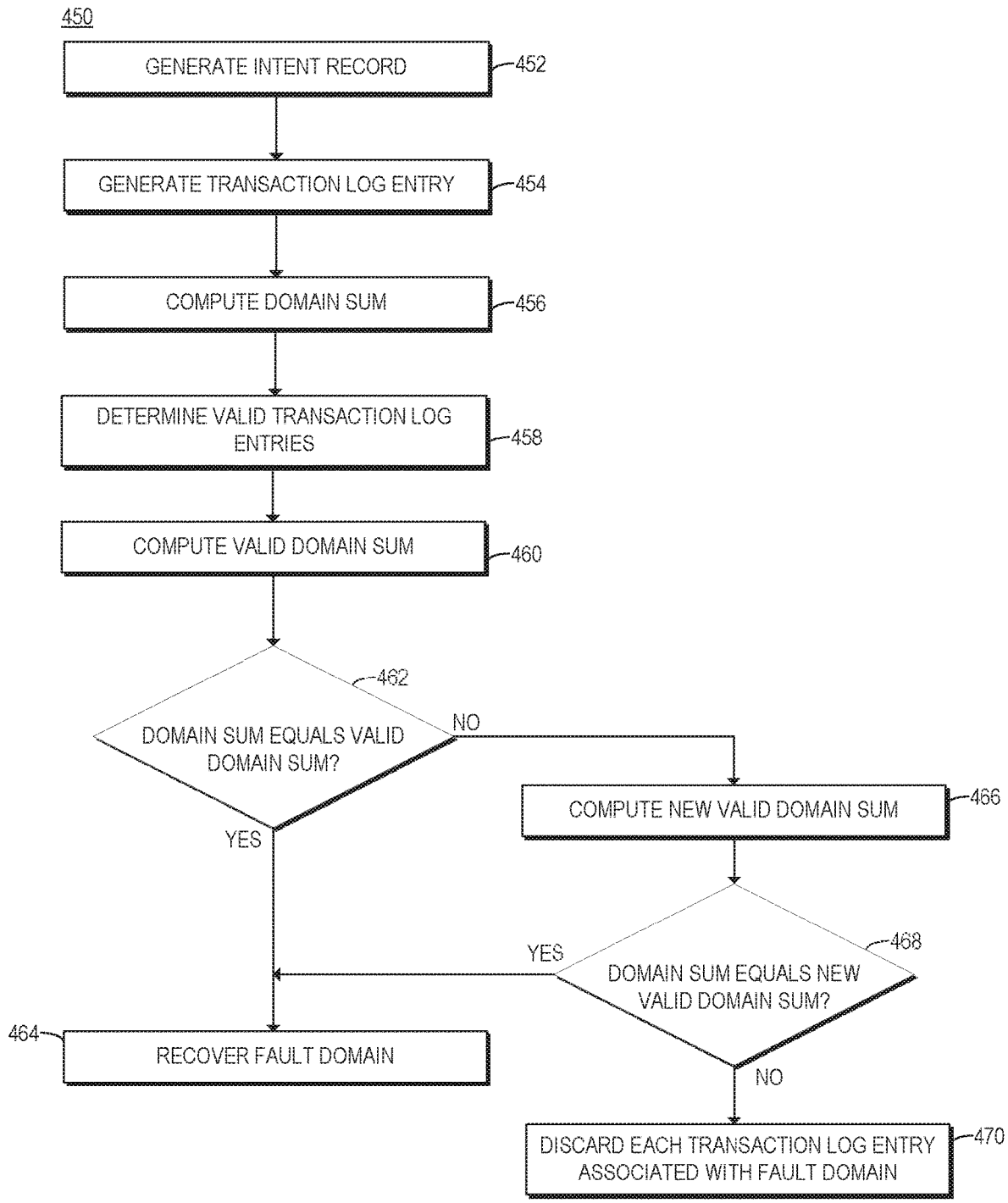
FIG. 4B is a flowchart of an example method including computing a new valid domain sum of a fault domain when a domain sum of the fault domain does not equal a valid domain sum of the fault domain.

FIG. 4B is a flowchart of an example method 450 including computing a new valid domain sum of a fault domain when a domain sum of the fault domain does not equal a valid domain sum of the fault domain. Although execution of method 450 is described below with reference to computing device 200 of FIG. 2, other suitable systems or devices for the execution of method 450 can be utilized (e.g., computing device 100 of FIG. 1). Additionally, implementation of method 450 is not limited to such examples.

In the example of FIG. 4B, method 450 may be a method of device 200. At 452 of method 400, instructions 232 may generate an intent record for the transaction. This generation may be performed as described above in relation to instructions 232 of FIG. 2. At 454, instructions 222 may generate in a transaction log a transaction log entry for a transaction, the transaction log entry comprising a transaction signature and a fault domain identifier that identifies a fault domain with which the transaction log entry is associated. This generation may be performed as described above in relation to instructions 222 of FIG. 2. At 456, instructions 224 may compute a domain sum for the fault domain based (at least in part) on the transaction signature of each transaction log entry associated with the fault domain. This computation may be performed as described above in relation to instructions 224 of FIG. 2. At 458, instructions 226 may determine whether each transaction log entry associated with the fault domain is valid. This determination may be performed as described above in relation to instructions 226 of FIG. 2. At 460, instructions 228 may compute a valid domain sum for the fault domain based (at least in part) on the transaction signature of each valid transaction log entry associated with the fault domain. This computation may be performed as described above in relation to instructions 228 of FIG. 2.

At 462, instructions 230 may determine whether the domain sum equals the valid domain sum. This determination may be performed as described above in relation to instructions 230 of FIG. 2. If it is determined that the domain sum equals the valid domain sum, method 450 may proceed to 464. At 464, based (at least in part) on a determination that the domain sum equals the valid domain sum, instructions 238 may recover the fault domain. In some examples, instructions 238 may also mark the fault domain valid. Recovery of the fault domain may be performed as described above in relation to instructions 238 of FIG. 2. If it is determined that the domain sum does not equal the valid domain sum, method 450 may proceed to 466. At 466, based (at least in part) on a determination that the domain sum does not equal the valid domain sum, instructions 234 may compute a new valid domain sum for the fault domain. This computation may be performed as described above in relation to instructions 234 of FIG. 2. At 468, instructions 236 may determine whether the domain sum equals the new valid domain sum. This determination may be performed as described above in relation to instructions 236 of FIG. 2. If it is determined that the domain sum equals the new valid domain sum, method 450 may proceed to 464. At 464, based (at least in part) on a determination that the domain sum equals the new valid domain sum, instructions 240 may recover the fault domain. In some examples, instructions 240 may also mark the fault domain valid. Recovery of the fault domain may be performed as described above in relation to instructions 240 of FIG. 2. If it is determined that the domain sum does not equal the new valid domain sum, method 450 may proceed to 470. At 470, instructions 242 may discard each transaction log entry associated with the fault domain. In some examples, instructions 242 may also mark the fault domain invalid. Discarding each transaction log entry associated with the fault domain may be performed as described above in relation to instructions 242 of FIG. 2.

Although the flowchart of FIG. 4B shows a specific order of performance of certain functionalities, method 440 is not limited to that order. For example, some of the functionalities shown in succession in the flowchart may be performed in a different order, may be executed concurrently or with partial concurrence, or a combination thereof. In some examples, 452, 454, and 456 may iterate several times before the method proceeds to 458. In such examples, the method may proceed to 458 after a fault or failure has been identified. In other examples, the method may proceed to 458 on a periodic or regular basis, for example, after a certain number of transaction log entries have been generated. In some examples, functionalities described herein in relation to FIG. 4B may be provided in combination with functionalities described herein in relation to any of FIGS. 1-4A.

What is claimed is:

1. A computing device comprising:
a processor; and
a machine-readable storage medium encoded with instructions executable by the processor to provide fault isolation in a transaction log, the machine-readable storage medium comprising instructions to:
generate in the transaction log a transaction log entry for a transaction, wherein the transaction log entry comprises a transaction signature and a fault domain identifier that identifies a fault domain with which the transaction log entry is associated;
generate an intent record for the transaction before generating the transaction log entry for the transaction, wherein the intent record is associated with the fault domain and comprises the transaction signature and an operation identifier;
compute a domain sum for the fault domain based on the transaction signature of each transaction log entry associated with the fault domain;
determine whether each transaction log entry associated with the fault domain is valid;
compute a valid domain sum for the fault domain based on the transaction signature of each valid transaction log entry associated with the fault domain;
determine whether the domain sum equals the valid domain sum;
based on a determination that the domain sum does not equal the valid domain sum, compute a new valid domain sum for the fault domain based on the operation identifier of the intent record; and
determine whether the domain sum equals the new valid domain sum.

2. The computing device of claim 1, wherein the machine-readable storage medium further comprises instructions to:
mark the fault domain valid and recover the fault domain based on a determination that the domain sum equals the valid domain sum.

3. The computing device of claim 1, wherein the instructions to compute the new valid domain sum further comprise instructions to:
determine whether the operation identifier of the intent record identifies an add operation or a remove operation;
add the transaction signature of the intent record to the valid domain sum to compute the new valid domain sum based on a determination that the operation identifier of the intent record identifies a remove operation; and
subtract the transaction signature of the intent record from the valid domain sum to compute the new valid domain sum based on a determination that the operation identifier of the intent record identifies an add operation.

4. The computing device of claim 1, wherein the machine-readable storage medium further comprises instructions to:
mark the fault domain valid and recover the fault domain based on a determination that the domain sum equals the new valid domain sum.

5. The computing device of claim 1, wherein the machine-readable storage medium further comprises instructions to:
mark the fault domain invalid and discard each transaction log entry associated with the fault domain based on a determination that the domain sum does not equal the new valid domain sum.

6. The computing device of claim 1, wherein the instructions to generate the transaction log entry for the transaction further comprise instructions to:
build a log entry for the transaction in a local memory area; and
copy the log entry for the transaction in the local memory area to the transaction log entry for the transaction in a remote memory area.

7. The computing device of claim 1, wherein the machine-readable storage medium further comprises instructions to:
generate the transaction log, wherein the transaction log is a global array comprising more than one fault domain, and wherein at least one of the more than one fault domain is dynamically allocated.

8. The computing device of claim 1, wherein the intent record comprises:
a single entry associated with the fault domain that is rewritten prior to the generation of each transaction log entry associated with the fault domain.

9. The computing device of claim 1, wherein the intent record comprises:
a portion of an intent log that logs a series of intent records.

10. A non-transitory machine-readable storage medium encoded with instructions executable by a processor of a computing device to provide fault isolation in a transaction log, the machine-readable storage medium comprising instructions to:
generate an intent record for a transaction, wherein the intent record is associated with a fault domain and comprises a transaction signature and an operation identifier;
generate in the transaction log a transaction log entry for the transaction after generating the intent record for the transaction, wherein the transaction log entry comprises the transaction signature and a fault domain identifier that identifies the fault domain with which the transaction log entry is associated;
compute a domain sum for the fault domain based on the transaction signature of each transaction log entry associated with the fault domain;
determine whether each transaction log entry associated with the fault domain is valid;
compute a valid domain sum for the fault domain based on the transaction signature of each valid transaction log entry associated with the fault domain; and
determine whether the fault domain is valid based on the domain sum, the valid domain sum, and the intent record;
determine whether the domain sum equals the valid domain sum;
based on a determination that the domain sum does not equal the valid domain sum, compute a new valid domain sum for the fault domain based on the operation identifier of the intent record; and
determine whether the domain sum equals the new valid domain sum.

11. The non-transitory machine-readable storage medium of claim 10, wherein the instructions to determine whether the fault domain is valid further comprise instructions to:
based on a determination that the domain sum does equal the valid domain sum, mark the fault domain valid and recover the fault domain.

12. The non-transitory machine-readable storage medium of claim 11, wherein the instructions to compute the new valid domain sum further comprise instructions to:
determine whether the operation identifier of the intent record identifies an add operation or a remove operation;
add the transaction signature of the intent record to the valid domain sum to compute the new valid domain sum based on a determination that the operation identifier of the intent record identifies a remove operation; and
subtract the transaction signature of the intent record from the valid domain sum to compute the new valid domain sum based on a determination that the operation identifier of the intent record identifies an add operation.

13. The non-transitory machine-readable storage medium of claim 11, wherein the machine-readable storage medium further comprises instructions to:
mark the fault domain valid and recover the fault domain based on a determination that the domain sum equals the new valid domain sum; and
mark the fault domain invalid and discard each transaction log entry associated with the fault domain based on a determination that the domain sum does not equal the new valid domain sum.

14. The non-transitory machine-readable storage medium of claim 10, wherein the intent record comprises:
a single entry associated with the fault domain that is rewritten prior to the generation of each transaction log entry associated with the fault domain.

15. The non-transitory machine-readable storage medium of claim 10, wherein the intent record comprises:
a portion of an intent log that logs a series of intent records.

16. A method for providing fault isolation in a transaction log, the method comprising:
generating in the transaction log a transaction log entry for a transaction, wherein the transaction log entry comprises a transaction signature and a fault domain identifier that identifies a fault domain with which the transaction log entry is associated;
generating an intent record for the transaction before generating the transaction log entry for the transaction, wherein the intent record is associated with the fault domain and comprises the transaction signature and the operation identifier;
computing a domain sum for the fault domain based on the transaction signature of each transaction log entry associated with the fault domain;
determining whether each transaction log entry associated with the fault domain is valid;
computing a valid domain sum for the fault domain based on the transaction signature of each valid transaction log entry associated with the fault domain;
determining whether the domain sum equals the valid domain sum;
based on a determination that the domain sum does not equal the valid domain sum, computing a new valid domain sum for the fault domain based on the operation identifier of the intent record;
determining whether the domain sum equals the new valid domain sum; and
recovering the fault domain based on a determination that the domain sum equals the new valid domain sum.

17. The method of claim 16, further comprising:
discarding each transaction log entry associated with the fault domain based on a determination that the domain sum does not equal the new valid domain sum.

18. The method of claim 17, wherein computing the new valid domain sum further comprises:
determining whether the operation identifier of the intent record identifies an add operation or a remove operation;
adding the transaction signature of the intent record to the valid domain sum to compute the new valid domain sum based on a determination that the operation identifier of the intent record identifies a remove operation; and
subtracting the transaction signature of the intent record from the valid domain sum to compute the new valid domain sum based on a determination that the operation identifier of the intent record identifies an add operation.

19. The method of claim 17, further comprising:
recovering the fault domain based on a determination that the domain sum equals the valid domain sum.

20. The method of claim 16, wherein the intent record comprises:
a single entry associated with the fault domain that is rewritten prior to the generation of each transaction log entry associated with the fault domain.

* * * * *